3,346,528
PROCESS OF CRYSTALLIZING ISOTACTIC POLYSTYRENE
Robert J. Slocombe and Ival O. Salyer, Dayton, Ohio, and Seymour Newman, Springfield, Mass., assignors to Monsanto Company, a corporation of Delaware
No Drawing. Filed Dec. 30, 1958, Ser. No. 783,693
19 Claims. (Cl. 260—30.6)

The present invention is directed to plasticized crystalline polystyrene compositions and methods of preparing same.

The invention involves incorporating suitable solvating plasticizers into isotactic polystyrene to improve flexibility, processibility and elastomeric properties, and to broaden the temperature range at which crystalline polystyrene articles prepared therefrom can be utilized. The plasticization preferably is such that it lowers the softening point of the crystalline polystyrene composition below ordinary room temperature.

Polystyrene is one of the most important polymers of commerce, being widely used in a variety of applications. Polystyrene can be prepared by a number of procedures, e.g., it is known to polymerize styrene in the absence of added catalysts, by free radical catalysts such as by peroxides and related compounds, and by polymerizations in solvents in mass or bulk, and by emulsion and suspension techniques. However, ordinary commercial polystyrene has properties which render it unsuitable for a number of uses. In particular, ordinary commercial polystyrene has poor high temperature properties due to its softening at temperatures circa 90 to 100° C., and the fact that it has no appreciable elastomeric range as it is converted from a rigid solid to a viscous liquid to a free-flowing liquid over a very narrow temperature range, e.g., a Stifflex range of about 15 centigrade degrees. Moreover, ordinary polystyrene is somewhat brittle and lacking in impact strength at ordinary temperatures and it is difficult to overcome this defect by plasticization as the properties of polystyrene compositions containing plasticizers are very dependent upon the amounts of plasticizer which can be extremely critical; for example, the tensile strength can go from very high values to very low values with a change of a few percentage points in the amount of plasticizer; moreover, even when the proper amount of plasticizer is employed, a change of a few degrees in temperature will radically affect properties of the composition.

The commercial polystyrene referred to above has what can be described as an irregular or atactic structure and is ordinarily found in amorphous form. It has recently been reported (Isotactic Polymers, G. Natta, Makromol. Chem. 16, 213 (1955)) that polystyrene having a regular or isotactic structure and capable of assuming crystalline form can be prepared by polymerizing styrene in the presence of Ziegler catalysts. While crystalline polystyrene has better high temperature properties as compared with amorphous polystyrene, it is still brittle and lacking in elastic properties at ordinary temperatures. Moreover, the high melting point of the polymer, of the order of 230° C., coupled with molecular degradation and/or the conversion from crystalline to amorphous form possibly resulting from high temperature treatments, render processing of crystalline polystyrene difficult.

It has now been discovered that crystalline polystyrene having desirable flexibility, toughness and processing characteristics can be prepared from isotactic polystyrene by incorporating therein amounts of compatible plasticizer materials as disclosed herein. The presence of plasticizers makes it possible to extend the transition range of the polymer to the neighborhood of or below room temperature and at the same time maintain the desirable high temperature properties of crystalline polystyrene. The transition range is the range of temperatures in which the composition is flexible and elastic. The transition range can be measured by the Clash-Berg test (Industrial Engineering Chemistry, 34, 1218 (1942)), in which the brittle temperature ($T_f$) is the temperature at which the stiffness modulus is 135,000 p.s.i., the rubber temperature ($T_{2000}$) is the temperature at which the stiffness modulus is 2000 p.s.i., and the Stifflex or transition range is the rubber temperature minus the brittle temperature. Plasticization according to the present invention can, for example, lower the brittle temperature ($T_f$) from circa 97° C. to below room temperature and at the same time keep the lowering of the rubber temperature ($T_{2000}$) at a minimum, maintaining same as high as 180° C. or the like; thus the useful transition range can be extended from the 15 or so centigrade degrees of ordinary polystyrene, or the 100 or so centigrade degrees of crystalline polystyrene to better than 150 centigrade degrees by the present invention. Plasticization according to the present invention produces desirable properties for low temperature uses without any corresponding sacrifice of high temperature properties.

In one special aspect the present invention concerns plasticized crystalline polystyrene having flexibility and rubbery properties at temperatures of ordinary use, such as room temperature or temperatures somewhat below or above room temperature. Flexibility is a characteristic well understood in the art as contrasting with "rigid" or "brittle," and is readily determined by the ability of a material to be bent back upon itself without breaking. The plasticized crystalline polystyrene of the present invention will ordinarily have its stiffness modulus (Clash-Berg test) below 100,000 p.s.i. at temperatures of contemplated use, such as room temperature or thereabouts, and can have stiffness modulus below 50,000 or 60,000 p.s.i., to give flexibility properties resembling those of low-pressure polyethylene; or the stiffness modulus can range down to the 20,000 p.s.i. or so range of high pressure polyethylene, or on down to the 5,000 to 10,000 p.s.i. or the like range of plasticized polyvinyl chloride. The stiffness modulus of the present compositions ordinarily does not drop below 5,000 to 10,000 p.s.i. until temperatures within 15° or less of the melting point are reached. It can be seen that the present invention makes it possible for crystalline polystyrene to replace the aforenamed common flexible plastics in many of their uses. For example, suitably plasticized crystalline polystyrene can be employed in such application as molded objects of various kinds, such as "squeeze" bottles and the like, as films or coatings, either unsupported or on such supports as metal, wood, fabric backings, etc., as adhesives or binders in various wood, fabric, and other laminates, in the preparation of flexible foamed materials for padding, upholstery and the like, as high temperature electrical insulators, etc.

The plasticized crystalline polystyrenes of the present invention are capable of retracting upon being stretched, i.e., they have elastomeric properties, as is also evident from Clash-Berg tests of the materials. They will generally have tensile strengths in the range of about 1500 to 2000 or so p.s.i., although strengths can go higher in some cases, e.g., to 2500 or 3000 p.s.i. It will generally be detrimental to plasticize the crystalline polystyrene to such an extent that the tensile strength is less than 500 p.s.i.

In addition, another advantage of plasticizing isotactic polystyrene is that it makes possible the cold-drawing of the material into films or fibers. Moreover, when plasticized isotactic polystyrene in substantially amorphous state is drawn, the drawing in itself in the presence of the plasticizer causes very substantial conversion to crystalline form thereby lessening the extent of any heat treatments required for such purpose.

Plasticizers have, of course, previously been employed with various polymers. However, plasticizers have but very limited value in modifying the properties of ordinary polystyrene, as noted hereinabove; therefore it was completely unexpected to find that suitable plasticizers can have very useful and radical effects on the properties of crystalline polystyrene compositions.

The phenomenon of plasticization is not completely understood. However, it is known to be related to the solvation properties of the plasticizer for the resin to be plasticized. Polystyrene in crystalline state is considerably more resistant to ordinary solvents than is ordinary amorphous polystyrene, thus making its plasticizability unpredictable from comparison with ordinary polystyrene.

It has now been discovered, however, that plasticized crystalline polystyrene of desirable properties can be prepared if high-boiling liquids, or low-melting solids, of suitable solubility parameter are selected as plasticizers. It can be theorized that the plasticization is due to solvation of the atactic polystyrene ordinarily present in substantial amounts in isotactic polystyrene polymerizates. However, we do not intend to be bound by any theory of the mechanism, as the plasticization disclosed herein is effective regardless of what the mechanism may be.

The high boiling liquids suitable for use herein are organic liquids having fairly high solvating power for crystalline polystyrene materials, as indicated by the solubility parameters ($\delta$) of the liquids which are in the range of about 7 to 12 and preferably in the range of 8 to 11. The solubility parameters referred to are values represented by $\delta_o$ in Hildebrand's equation for the enthalpy of mixing:

$$\Delta H = V_m (\delta_o - \delta_p)^2 \phi_o \phi_p$$

as discussed by Severs and Smitmans in the abstracts of papers presented at the Miami meeting of the American Chemical Society, April 1957, Division of Plant, Plastics and Printing Ink Chemistry, vol. 17, No. 1, pages 10 to 17. In the equation, $V_m$ equals volume of mixture, cc.; $\delta_o$, $\delta_p$ equal solubility parameters of solvent and polymer respectively, calories per cc.; and $\phi_o$, $\phi_p$ equal volume fraction of solvent and polymer respectively. The solubility parameters can be calculated by the molar-attraction constants of Small (J. Applied Chem. 3, p. 75 (1953)). While the high boiling liquids employed are usually purely organic in nature, it will be understood that high boiling organic materials containing substantial portions of inorganic or other material are also within the invention as, for example, tricresyl phosphate.

In the above equation, the nearer the respective solubility parameters of solvent and polymer approach each other, the smaller the enthalpy of mixing ($\Delta H$) and the higher the solubility of the polymer in the solvent, as discussed in the aforementioned Severs and Smitman's paper. A further general discussion of factors determining solubility of polymers in liquids is found in Elastomers and Plastomers, Houwink, Elsevier Pub. Co., 1950, vol. 1, chapter 9. Compatibility between a crystalline polystyrene and a proposed plasticizer material is dependent upon good solvation, as indicated by similarity of the solubility parameters of plasticizer and polymer; for crystalline polystyrene having a solubility parameter of about 9.2 (very close to that of ordinary polystyrene), it has now been discovered that good plasticization can be achieved if high boiling liquids having solubility parameters of 7 to 12, and preferably 8 to 11, are employed. Among the suitable plasticizing materials are the following which have the indicated solubility parameters (in calories/cc., according to the method of Small, reference supra):

| | Solubility parameter |
|---|---|
| Tricresyl phosphate | 10.40 |
| Diphenyl (2-ethylhexyl) phosphate | 9.30 |
| Diethylene glycol dibenzoate | 10.48 |
| Dipropylene glycol dibenzoate | 9.60 |
| Tri(2-ethylhexyl) phosphate | 8.25 |
| Diisooctyl phthalate | 8.83 |
| Di(2-ethylhexyl) phthalate | 8.89 |
| Di-n-octyl phthalate | 8.91 |
| Di-capryl phthalate | 8.70 |
| Tetrabutyl thiodisuccinate | 9.10 |
| Didecyl phthalate (Flexol 10–10) | 8.89 |
| Di-(2-ethylhexyl) adipate (Flexol A–26) | 8.34 |
| Polyethylene glycol di(2-ethylhexoate) (Flexol 4GO) | 8.86 |
| Didecyl adipate | 8.42 |
| Isooctyl palmitate | 7.75 |

It will be realized that the solubility parameters are just one of the means which can be used to express the required relationship between crystalline polystyrene and suitable plasticizing materials; for, other related definitive parameters are known which can also be utilized in the definition of suitable plasticizers. For example, cohesive energy density or precipitation values can be employed. For example, suitable plasticizers for crystalline polystyrene usually have precipitation values (in ml. methanol) of from 4 or 5 to 25 or higher as is the case with the following plasticizers:

| | Ml. CH$_3$OH |
|---|---|
| Ethyl phthalyl ethyl glycolate (Santicizer E–15 plasticizer) | 5 |
| Butyl phthalyl butyl glycolate (Santicizer B–16 plasticizer) | 7 |
| Tricresyl phosphate (Santicizer 141 plasticizer) | 10 |
| Butyl benzyl phthalate (Santicizer 160 plasticizer) | 15 |
| Cresyl diphenyl phosphate (Santicizer 140 plasticizer) | 19 |
| Polychlorinated polyphenyls ("Aroclor 1254") | 20 |
| Hydrogenated terphenyls ("HB–40" terphenyls, $n_D^{25}$ 1.5675±0.0075) | 22 |

The precipitation values for the plasticizer materials were obtained by determining the volume of methanol (ml.) required to cloud a 1% solution of crystalline polystyrene in a solvent of 50% by volume plasticizer and 50% by volume diluent (benzene). Benzene itself (which is, of course, a low-boiling material unsuitable as a plasticizer), gives a precipitation value of 31. The preferred plasticizers for use herein will have precipitation values in the range of 15 to 25 or so. The above precipitation values do not correspond to those obtained when ordinary polystyrene is used in the test.

The suitable plasticizers for use herein are also characterized by their boiling points; liquids having a boiling point of at least 180° C., preferably of at least 200° C., are suitable. It will be realized that low melting solids are also considered liquids for the purpose of the invention—particularly those of melting point no greater than 50° C.

The amount of plasticizer in the compositions of the present invention can vary somewhat, depending upon the particular plasticizer employed and the degree of plasticization desired—as will be understood by those skilled in the art in view of the present disclosure. For example, amounts of plasticizers as defined herein constituting from about 10 to about 50% by weight of the plasticized crystalline polystyrene composition are suitable, and amounts from 25% to 45% by weight are preferred. The particular degree of plasticization desired is dependent upon the application in view. However, it will generally be desirable that the plasticization lower the second order transition temperature ($T_f$) by at least 20 to 30 centigrade degrees and preferred to lower it to 40° C.

or the like. Moreover, if plastic properties are required at room temperature, or the like, it is necessary to lower the second order transition temperature below room temperature (circa 27° C.). It will not be desirable, of course, to put the crystalline polystyrene completely into solution, or to solvate it to the point at which there is a rapid drop, i.e., a break, in its tensile strength or other properties. In general the required amount of plasticizer in the total plasticized crystalline polystyrene composition is approximately 1% by weight for each 3% by which the $T_f$ of the composition is lowered. Thus, from about 25 to 40% of plasticizer will ordinarily be used to obtain compositions having $T_f$ in the neighborhood of room temperature or below.

Example 1

A 15 gram amount of crystalline polystyrene, 2.8 ml. chloronaphthalene-1 and 100 ml. benzene were charged into a bomb and mixed by agitation to form a heavy slurry. The bomb was sealed and heated in an oven at 205° C. for 4 hours. The bomb was permitted to cool and was then opened and the clear viscous solution of polymer was placed in a vacuum desiccator under water-aspirator vacuum, and heated by means of an infra-red lamp for 4 hours to remove benzene. The resulting sample was molded at 240° C., 1000 p.s.i., for 3 minutes and quench cooled. The molded specimen containing about 10% chloronaphthalene-1 by weight had a second order transition temperature ($T_f$) considerably lower than that of unplasticized crystalline polystyrene.

The crystalline polystyrene plasticized in the above procedure was prepared by polymerizing styrene at 65–70° C. in kerosene medium with a catalyst prepared from 5.2 cc. titanium tetrachloride and 20 cc. triethyl aluminum. The polymerization was quenched by addition of isobutanol, and the resulting polystyrene was treated with acetone containing 1% by volume of concentrated hydrochloric acid.

Example 2

By following the procedure of Example 1, 20% by weight of dimethylnaphthalene was incorporated into crystalline polystyrene. A sample of the plasticized material molded as in Example 1 had a second order transition temperature ($T_f$) of 40° C., and a first order transition temperature ($T_{2000}$) of 190° C.; thus, the useful transition range was lowered to the neighborhood of room temperature. The incorporation of more plasticizer, say a total of 30 to 40% by weight, will lower $T_f$ to room temperature or below.

The polystyrene utilized above was a medium melt-flow product obtained by polymerization at about 70° C. in n-hexane utilizing as catalyst 5.2 cc. of $TiCl_4$ and 20.4 cc. of triethyl aluminum with 0.5 cc. thiophenol as modifier. The polymerization was quenched by addition of isobutanol, and the resulting polymer was treated with acetone containing sulfuric acid. The polystyrene had crystallinity of 15 to 20% as determined by X-ray diffraction.

Example 3

A 8.6 gram amount of butyl benzyl phthalate was incorporated into a 20 gram amount of crystalline polystyrene according to the procedure of Example 1 to give a product containing about 30% plasticizer by weight. A molded specimen had a $T_f$ of 15° C. and $T_{2000}$ of 180° C.

Example 4

Crystalline polystyrene polymer was prepared and worked up as described for Example 2. A 20-gram amount of the polymer was mixed in a stainless steel bomb with 100 ml. benzene and 13.4 grams butyl benzyl phthalate by means of a "Lightning" mixer. The bomb was sealed, tested for leaks, and heated at 205° C. for 4 hours. The bomb was then permitted to cool overnight. The resulting clear, viscous solution was placed in a Petri dish in a vacuum desiccator under water aspirator vacuum and heated 4 hours with an infrared lamp. The sample was molded at 240° C. at 1000 p.s.i. for 3 minutes; the molded sample of plasticized crystalline polystyrene had a brittle temperature ($T_f$) well below room temperature at 0° C., while the first order transition ($T_{2000}$) was still high at 180° C. Thus this plasticized crystalline polystyrene containing about 40% by weight of butyl benzene phthalate is flexible over a wide range of useful temperatures making possible a variety of useful applications.

Example 5

A 10-gram amount of crystalline polystyrene was mixed with 10 grams of commercial polystyrene, 13.4 grams butyl benzyl phthalate, and 100 ml. benzene. The mixture was heated and dried as in Example 4. The resulting polymer was then found to bend on a roll mill and to flux well thereon at 175° C.

Example 6

Carbon tetrachloride-soluble material was extracted from a sample of crystalline polystyrene in the following manner. A 287-gram portion of crystalline polystyrene was stirred with 10 liters of carbon tetrachloride for 15 hours and allowed to stand overnight prior to withdrawing the clear liquor in the lower portion of the container and replacing same with fresh carbon tetrachloride. The foregoing procedure was repeated two times. Methanol was then added to the container to harden the swollen polymer particles. The mixture was then filtered on a Buchner funnel and the filtered solids were washed with methanol and dried in a vacuum oven at 60° C. The solids now weighed 238 grams, indicating that about 17% of the polymeric material had been extracted by the carbon tetrachloride.

The isotactic polystyrene solids were then dry-blended with a 50:50 mixture of hydrogenated terphenyl ("HB–40" plasticizer) and di-n-octyl phthalate in proportions to give compositions containing respectively 20%, 30% and 40% plasticizer and extruded twice through a 1" extruder the body and die temperature being 240° C. Each of the plasticized compositions was compression molded at temperatures around 280° C. and cold drawn from amorphous state causing a partial conversion to crystalline form and the crystallinity was then increased by annealing at temperatures upwards of 150° C. for 5 to 30 minutes.

Example 7

Strips of polystyrene film having a low degree of crystallinity were placed in the following liquids: butyl stearate, tricresyl phosphate, diethyl phthalate, hydrogenated terphenyl and a polychlorinated polyphenyl designated by the brand name "Aroclor 1242." The strips increased in length and exhibited some swelling in each of the liquids.

Example 8

A crystallizable polystyrene polymer was slurried in chloroform with the polychlorinated polyphenyl of Example 7, permitted to dry by evaporation, molded into a film, and heated at 150° C. to induce crystallinity. The films so-treated were opaque but did not have the brittleness characteristic of unmodified crystalline polystyrene.

Example 9

A mixture of crystallizable crystalline polystyrene and dibenzyl ether containing 20% by weight of the latter was heat treated to induce crystallinity. The resulting elastomeric material had a glass transition temperature at about room temperature and retained relatively high modulus up to circa 200° C.

Example 10

Films were prepared from an example of crystallizable polystyrene containing 23.2% by weight of the polychlorinated polyphenyl of Example 7, by compression molding. The films were then heated as designated below, and their tensile properties were compared to those of a crystallizable polystyrene film cast from chloroform.

| Percent Plasticizer by Weight | Heating Time (hrs.) | Heating Temp. (° C.) | Percent Elongation at Break | Young's Modulus (p.s.i.) | Tensile Strength (p.s.i.) |
| --- | --- | --- | --- | --- | --- |
| 0 | (1) | 130 | 2.5 | $2.3 \times 10^5$ | 5,600 |
| 23.2 | 2.0 | 156 | 10 | $1.25 \times 10^5$ | 2,875 |
| 23.2 | 3.0 | 165 | 8 | [2] $0.76 \times 10^5$ | 2,000 |

[1] Heated sufficiently to induce opacity.
[2] Secant modulus over first 1% strain.

The crystallizable polystyrene utilized herein is ordinarily obtained by polymerizing styrene in the presence of Ziegler catalyst, but crystallizable polystyrene obtained by any other method can be used. Crystallizable polystyrene is characterized by regularity of polymeric structure over a large portion of the molecular chains and in a substantial portion of the polymeric molecules. This regularity of structure refers to the steric configuration of the polymer; the alternate carbon atoms in the backbone of a polystyrene molecule are asymmetric and if such atoms have the same configuration (D or L) the polymer is said to isotactic. If a purely isotactic polystyrene molecule were stretched out, all phenyl groups would stick out from one side. However, isotactic polystyrene is generally accompanied by atactic polystyrene, either in the same molecules with the isotactic structure or in separate molecules. In fact, in the present invention it is often desirable that 50% or more of the polymeric structure be atactic, and the structure can be as much as 80% or more atactic. Such percentages of atactic polystyrene can be obtained either in the Ziegler-catalyzed polymerization procedures or by incorporating ordinary atactic polystyrene in isotactic polystyrenes obtained by Ziegler-catalyzed procedures. More purely isotactic polystyrenes can be obtained by extraction of Ziegler polymerizates. While isotactic polystyrene is the most common of the crystallizable polystyrenes, syndiotactic or any other crystallizable polystyrene can be used herein.

In addition to the suitable procedures for obtaining isotactic polystyrene disclosed in the literature, the polymerization and isolation procedures disclosed in the copending application S.N. 498,254 of Roland J. Kern are very suitable, and are incorporated herein by reference.

The Ziegler catalysts employed in preparing isotactic polystyrene for use in the present invention are well known to the art. Probably the preferred group of these catalysts is that disclosed in Belgian Patent No. 533,362 issued May 16, 1955, to Ziegler, namely catalysts prepared by the interaction of a tri-alkyl aluminum with a compound of a metal of Groups IV-B, V-B, or VI-B of the Periodic System, including thorium and uranium. A particularly preferred group of such catalysts are prepared by interaction of (a) an aluminum compound of the general formula $R_2AlX$ wherein R is an alkyl, cycloalkyl or aryl radical and X is hydrogen, halogen or an alkyl, cycloalkyl or aryl radical, with (b) a metal halide selected from the group consisting of the chlorides, bromides and iodides of titanium and zirconium. The mol ratio of aluminum to titanium (or zirconium) can vary over a wide range, suitable values being from 0.3:1 to 10:1 on up to 15:1 or higher, but it is generally preferred to use a ratio between 2.0:1 and 5:1. The amount of catalyst can vary, for example, from 0.01 to .5 weight percent based on styrene, but will desirably be in the neighborhood of 0.1 to 2.0 weight percent, and the polymerization can be effected over a wide temperature range, for example, from −10° C. to 160° C. or the like. The polystyrenes employed in the present invention are generally high molecular weight materials; however, suitable polystyrenes can vary in molecular weight and can have, for example, specific viscosities (0.1% solution in toluene at 25° C.) from about 0.2 to 1.0 or the like.

Substantial amounts of the polystyrene in the compositions of the present invention are in crystalline form, say at least 10%. The percentage of crystallinity in the polymer cannot, of course, be greater than the percentage of isotacticity. Ordinarily the percentage of crystallinity in the polystyrene of the present compositions will not be greater than about 50%; 25 to 50% crystallinity is very suitable for the present invention. The density of polystyrene is a suitable measure of crystallinity, and the polystyrene of the present compositions will have densities (in unplasticized form) of from about 1.06 or greater to 1.09.

The isotactic polystyrene powder as obtained from Ziegler polymerization is ordinarily partially crystalline in form. However, heating the powder to temperatures well above the melting point (230° C.), e.g., to temperatures of 280° or so, will destroy the crystallinity and will also destroy crystallization nuclei; if the polymer is then cooled below the glass temperature, i.e., below 95–100° C., it will be in amorphous form but crystallization sites will be re-established and subsequent heating at high temperatures will re-establish crystallinity. If crystalline polystyrene is heated just above its melting point, say to 240° C., rapid cooling is required to produce the amorphous form. The presence of crystallinity in the plasticized compositions is readily determinable; for example, the Stifflex range (as determined by Clash-Berg test) will be very broad, generally more than 50 or 100 centigrade degrees, as compared with the very narrow Stifflex ranges for amorphous polystyrene. Stated another way, the rubber temperature ($T_{2000}$) of plasticized crystalline polystyrene will advantageously be above 100° C., although it would be possible to have a lower rubber temperature if the crystallinity were very low, or large amounts of plasticizer were employed.

Generally there will be advantage in treating the plasticized polystyrene in a manner to develop the maximum crystallinity of which the particular styrene is capable, depending upon the degree of isotacticity of course; this prevents subsequent additional crystallization with accompanying change in properties. The amount of suitable plasticizer must then be such as to give the desired properties with a composition containing the isotactic polystyrene in its particular maximum crystallization state.

The plasticized crystalline polystyrenes of the present invention can be prepared by either incorporating plasticizers as defined herein into crystalline polystyrene in a manner which does not destroy crystallinity, or by treating an amorphous plasticized isotactic polystyrene, as by heating, to obtain the desired crystallinity. Plasticization makes it easier to develop crystallinity in an isotactic polystyrene.

The plasticizer can be incorporated in the isotactic polystyrene by various procedures such as soaking, molding, milling or other mechanical means of working, mixing with the aid of a volatile solvent, absorption with the aid of a swelling agent which can then be extracted or volatilized, or by any other means effective for incorporating the plasticizer.

High boiling organic liquids of the required solubility parameter and belonging to the following classes of materials are suitable for use in the presently disclosed invention: organic esters, e.g., alkyl or other aliphatic esters of aromatic acids, particularly of dicarboxylic aromatic acids, alkyl or other aliphatic esters of halogenated aromatic carboxylic acids, alkyl or other aliphatic esters of long chain fatty acids; carbonates of hydroxybenzoic acid esters, triaryl phosphates, etc.; organic ethers, e.g., alkyl ethers of alkylated phenyl-phenols, diaryl ethers and ethers of hydroxy diphenyl; aromatic sulfonamides, e.g., such toluenesulfonamides as N-ethyltoluenesulfonamides; hydrocarbon, particularly aromatic hydrocarbons, e.g., arylaliphatic hydrocarbons, mixtures of terphenyls, polycyclic aromatic hydrocarbons, and non-volatile mineral oils having average molecular weight of 200–850; halogenated hydrocarbons, e.g., chlorinated naphthalene, chlorinated diphenyl, chlorinated polyphenyls, aryloxyalkyl chlorides, chlorinated terphenyls and hydrogenated terphenyls, etc.; natural or synthetic resins and waxes, e.g., rosins and rosin esters. It will be realized that the classes of materials disclosed above can be utilized either alone or admixed with each other or with other plasticizers disclosed herein or known to the art. For use alone the ester or ether type plasticizers, especially the ester type, are generally most suitable. Along with the ester or ether type plasticizers, the hydrocarbon or halogenated hydrocarbon plasticizers can be employed as extenders, e.g., butyl stearate with hydrogenated terphenyls, and the results are often better than with any single type plasticizer alone. It will be realized that the term "hydrocarbon" plasticizer is used to indicate the class contemplated and not to indicate that the presence of functional groups (such as are present in the other types disclosed) will render the plasticizer inoperative; in fact, the presence of functional groups, even other than those present in the other types of disclosed plasticizers, as part of an essentially hydrocarbon plasticizer will not render the material inoperative, and such essentially hydrocarbon materials can be considered as hydrocarbons. Moreover, it will be realized that any plasticizing materials known to the art, regardless of whether they belong to any of the foregoing classes, are suitable for use in the present invention provided that they have suitable compatibility and non-volatility as taught herein.

We claim:

1. The method of promoting the crystallization of isotactic polystyrene which comprises forming a composition comprising isotactic polystyrene and a high boiling organic liquid of boiling point of at least 200° C. and solubility parameter from 8 to 11 in amount of 25% to 45% by weight of the composition, forming said mixture into a desired configuration, and heat treating to induce crystallinity.

2. The method of claim 1 in which the composition is annealed at temperatures of at least 150° C.

3. The method of claim 1, in which the composition was cold drawn.

4. The method of claim 1 in which the composition was formed by molding.

5. The method of claim 1 in which the high boiling liquid is a mixture of high boiling hydrocarbons and carboxylic acid esters.

6. The method of claim 1 in which the high boiling liquid is a mixture of an alkyl phthalate and hydrogenated terphenyls.

7. A process for promoting the crystallization of isotactic polystyrene which comprises forming a homogeneous mixture of isotactic polystyrene and high boiling organic compounds selected from the group consisting of triaryl phosphates and alkyl diesters of dibasic acids, said compounds being present in an amount of from 0.275 to 0.667 part per part of crystallizable polystyrene, forming said homogeneous mixture into a desirable configuration and thereafter annealing said formed mixture to induce crystallinity.

8. A process for promoting the crystallization of isotactic polystyrene which comprises forming a homogeneous mixture of isotactic polystyrene and high boiling organic compounds selected from the group consisting of triaryl phosphates and alkyl diesters of dibasic acids, said compounds being present in an amount of from 0.275 to 0.667 part per part of crystallizable polystyrene, forming said homogeneous mixture into a desirable configuration and thereafter annealing said formed mixture at a temperature of approximately 150° C. for approximately 30 minutes.

9. The process of claim 7 in which the mixture is annealed at temperatures above 150° C.

10. A process for promoting the crystallization of isotactic polystyrene which comprises forming a homogeneous mixture of isotactic polystyrene and high boiling organic compounds selected from the group consisting of triaryl phosphates and alkyl diesters of aromatic dicarboxylic acids, said compounds being present in an amount of from 0.275 to 0.667 part per part of crystallizable polystyrene, forming said homogeneous mixture into a desirable configuration and thereafter annealing said formed mixture to induce crystallinity.

11. A process for promoting the crystallization of isotactic polystyrene which comprises forming a homogeneous mixture of isotactic polystyrene and a triaryl phosphate in an amount of from 0.275 to 0.667 part per part of crystallizable polystyrene, forming said homogeneous mixture into a desirable configuration and thereafter annealing said formed mixture to induce crystallinity.

12. A process for promoting the crystallization of isotactic polystyrene comprising forming a homogeneous mixture of isotactic polystyrene and an organic compound containing at least 12 carbon atoms which is selected from the class consisting of triaryl phosphates and alkyl diesters of dibasic acids, said organic compound being present in an amount of from 0.275 to 0.667 part per part of crystallizable polystyrene, forming said homogeneous mixture into a desired configuration and thereafter annealing said formed mixture until said isotactic polystyrene reaches maximum crystallinity.

13. A process for promoting the crystallization of isotactic polystyrene comprising forming a homogeneous mixture of isotactic polystyrene and an organic compound containing at least 12 carbon atoms which is selected from the class consisting of triaryl phosphates and alkyl diesters of dibasic acids, said organic compound being present in an amount of from 0.275 to 0.667 part per part of crystallizable polystyrene, forming said homogeneous mixture into a desired configuration and thereafter annealing said formed mixture at a temperature of 150–200° C. until said isotactic polystyrene has reached maximum crystallinity.

14. A process for promoting the crystallization of isotactic polystyrene comprising forming a homogeneous mixture of isotactic polystyrene and an organic compound containing at least 12 carbon atoms, which is selected from the class consisting of triaryl phosphates and alkyl diesters of dibasic acids, said organic compound being present in an amount of from 0.275 to 0.667 part per part of crystallizable polystyrene, forming said homogeneous mixture into a desired configuration and thereafter annealing said formed mixture at a temperature of approximately 160° C. until said isotactic polystyrene has reached maximum crystallinity.

15. A process for promoting the crystallization of isotactic polystyrene comprising forming a homogeneous mixture of isotactic polystyrene and an organic compound containing at least 12 carbon atoms which is selected from the class consisting of triaryl phosphates and alkyl diesters of dibasic acids, said organic compound being present in an amount of 0.275 part per part of crystallizable polystyrene, forming said homogeneous mixture into a desired configuration and thereafter annealing said formed mixture at a temperature of approximately 160° C. for approximately 30 minutes.

16. A process for promoting the crystallization of isotactic polystyrene comprising forming a mixture of isotactic polystyrene and tricresyl phosphate, said tricresyl phosphate being present in an amount of 0.275 part per part of crystallizable polystyrene, forming said homogeneous mixture into a desired configuration and thereafter annealing said formed mixture at a temperature of 160° C. until said isotactic polystyrene has reached maximum crystallinity.

17. The method of promoting the crystallization of isotactic polystyrene which comprises forming a composition comprising isotactic polystyrene and a high boiling organic liquid of boiling point at least 180° C. and solubility parameter from 7 to 12 in an amount of 10 to 50% by weight of the composition, forming said mixture into a desired configuration, and heat treating to induce crystallinity.

18. A method for promoting the crystallization of isotactic polystyrene which comprises forming a homogeneous mixture of isotactic polystyrene and high boiling organic compounds selected from the group consisting of triaryl phosphates and alkyl diesters of dibasic acids, said compounds being present in an amount of 25% to 45% by weight of the composition, and thereafter heating the composition at temperatures above 150° C. to develop crystallinity.

19. A process for promoting the crystallization of isotactic polystyrene comprising forming a homogeneous mixture of isotactic polystyrene and an organic compound containing at least 12 carbon atoms which is selected from the class consisting of triaryl phosphates and alkyl diesters of dibasic acids, said organic compound being present in an amount of from 0.275 to 0.667 part per part of crystallizable polystyrene, forming said homogeneous mixture into a desired configuration and thereafter annealing said formed mixture at a temperature of less than the melting point of said isotactic polystyrene until said isotactic polystyrene has reached maximum crystallinity.

References Cited

UNITED STATES PATENTS

| | | | |
|---|---|---|---|
| 2,374,069 | 3/1945 | Bulthis | 260—34.2 |
| 2,530,852 | 11/1950 | Bixby | 260—31.8 |
| 2,537,575 | 1/1951 | Levy et al. | 260—31.8 |
| 2,600,122 | 6/1952 | Meyer et al. | 260—31.8 |
| 2,980,964 | 4/1961 | Dilke | 260—33.2 |
| 3,000,845 | 9/1961 | Doak et al. | 260—31.8 |

OTHER REFERENCES

Natta: "Journal of Polymer Science," vol. 16, pages 143–154, 1955.

Schildknecht: "Polymer Processes," vol. 10, High Polymer Series, pub. by Interscience Publishers, Inc., pages 222 and 223.

Doolittle: "The Technology of Solvents and Plasticizers," pages 955 and 956, published 1954 by Wiley and Sons.

JULIUS FROME, *Primary Examiner.*

LEON J. BERCOVITZ, DANIEL ARNOLD, MORRIS LIEBMAN, *Examiners.*

W. H. SHORT, L. T. JACOBS, *Assistant Examiners.*